UNITED STATES PATENT OFFICE.

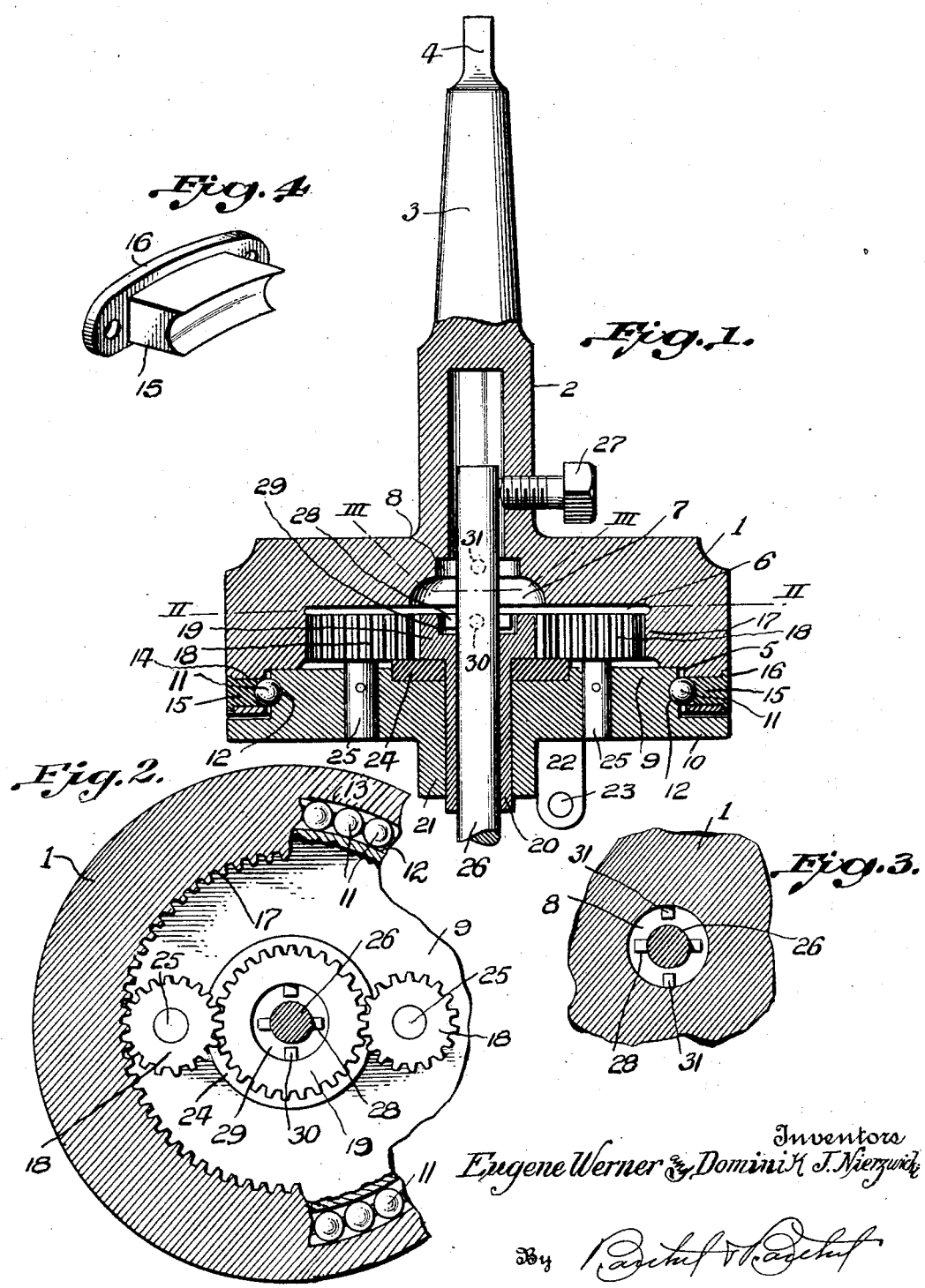

EUGENE WERNER AND DOMINIK J. NIERZWICKI, OF DETROIT, MICHIGAN.

DRILL HEAD.

1,410,147. Specification of Letters Patent. Patented Mar. 21, 1922.

Application filed September 2, 1919. Serial No. 321,073.

*To all whom it may concern:*

Be it known that we, EUGENE WERNER and DOMINIK J. NIERZWICKI, citizens of the United States of America, residing at Detroit, in the county of Wayne and State of Michigan, have invented certain new and useful Improvements in Drill Heads, of which the following is a specification, reference being had therein to the accompanying drawings.

This invention relates to drill heads and has special reference to that type of drill head which may be considered reversible by containing mechanism permitting of a drill, tapping device or other tool having its rotary motion reversed at will, so that a tap or drill may be removed from a piece of work.

Our invention aims to provide a drill head of the above type wherein the drill and head are movable relative to each other, with the drill head provided with simple and effective means for transmitting power from the head to the drill, and since the drill is movable relative to the head it is possible to adjust either so that the rotary movement imparted to the drill may be reversed at will.

Our invention still further aims to provide a drill head of the above type wherein the parts are constructed with a view of reducing the cost of manufacture and at the same time retain those features by which safety, durability, compactness and ease of assembling are secured. With such ends in view, our invention resides in the novel construction to be hereinafter considered and then claimed.

Reference will now be had to the drawings, wherein

Figure 1 is a vertical sectional view of the drill head partly in elevation;

Fig. 2 is a horizontal sectional view of a portion of the same, taken on the line II—II of Fig. 1;

Fig. 3 is a similar view taken on the line III—III of Fig. 1, and

Fig. 4 is a perspective view of a detached ball race member.

In the drawings, the reference numeral 1 denotes a drill head having a central socket 2 terminating in a shank 3 and a tang 4 so that the drill head may be connected to a drill press or other machine. The head 1 is circular in plan and has its lower face provided with stepped recesses 5, 6, 7, and 8, the latter communicating with the socket 2 and all of said recesses having a common axis.

Into the recess 5 of the head 1 extends the central portion 9 of a bottom plate 10 and this bottom plate is retained in engagement with the head 1 by ball bearings 11 in annular races 12 and 13 of the bottom plate 10 and the head 1 respectively. The antifrictional balls 11 may be placed in position through one or more openings 14 in the side walls of the head 1, said openings being normally closed by segment shaped ball race members 15 having heads 16 countersunk in and secured to the head 1, said ball race members representing a continuation of the ball race 13 in the head 1.

In the recess 6 is formed an internal gear 17 and meshing with said gear are opposed pinions 18 which mesh with a loose gear 19 having a hub portion 20 journaled in the bottom plate 10 and a boss 21 thereof, said boss having a side enlargement 22 for a rod 23 which permits of the bottom plate 10 being held stationary. The hub portion 20 of the gear 19 also extends through a wear plate 24, preferably made of fiber and seated in the central portion of the bottom plate 10, so that the central gear 19 may bear thereon. The opposed pinions 18 have stub shafts 25 which are fixed in the bottom plate 10 so that the pinions may rotate on said shaft and be held against accidental displacement relative to the internal rack or gear 17.

Extending through the central gear 19 and the hub portion 20 thereof is a shaft 26 to which a drill, tapping device or other tool may be coupled or the shaft 26 may represent a tool. However, the shaft 26 extends through the recesses 7 and 8 into the socket 2 where it may be fixed by a set screw 27 should it be desired to establish a fixed relation between the head 1 and said shaft or to maintain the shaft 26 elevated within the head. In many instances the set screw 27 may be dispensed with. The shaft 26, within the head 1, has a transverse pin or clutch member 28 and the upper face of the central gear 19 is provided with a recess 29 having inwardly projecting studs or clutch members 30 with which the pin 28 is adapted to engage or interlock and establish a driving relation between the central pinion 19 and said shaft. With the shaft 26 loose relative to the head 1, either may be shifted and assuming that the shaft 26 is raised relative to the central pinion 19, the pin 28 thereof will enter the recesses 7 and 8, the former providing clearance for the pin so that it may enter the latter, which is provided with inwardly projecting studs or clutch members 31 adapted to be engaged by the transverse pin 28 of the shaft 26. The shaft 26 when interlocked with the head 1, in the recess 8, will be driven in the same direction as said head, but when the shaft is lowered and interlocked with the loose gear 19, which is driven through the medium of the opposed gears 18, then said shaft is revolved in an opposite direction. The recess 7 permits of the shaft being placed in an intermediate position so that it is not interlocked with the head 1 or the central gear 19.

It is apparent from the construction outlined above that a tool may be driven by the head to perform a piece of work and then retracted by the head, and while we have illustrated a preferred embodiment of this invention, it is to be understood that the structural elements are susceptible to such variations and modifications as fall within the scope of the appended claims.

What we claim is:—

1. A rotary drill head having a socket, a bottom plate for said head, a shiftable shaft extending through said bottom plate into the socket of said head, a loose gear on said bottom plate adapted to be rotated by said head and in an opposite direction thereto, means carried by said shaft adapted to engage said gear or said head for rotation therewith, and means carried by said head socket adapted for holding said shiftable shaft stationary therein.

2. A drill head as characterized in claim 1, wherein ball bearings connect said bottom plate to said head.

3. In a tapping chuck, a socket and a bottom plate rotatable in relation to each other, a member extending into said socket, reversing gearing adapted to be driven by the socket, means adapted for alternately coupling said member to said socket and to said reversing gearing, said bottom plate being provided with a ball race and said socket provided with a cooperating ball race, and anti-frictional balls arranged in the ball races and acting to secure said socket and the bottom plate in operative relation.

4. In a tapping chuck, a socket member, a bottom plate associated therewith, reversing gear and clutch mechanism in said socket, and an anti-frictional bearing associated with the socket and plate and forming an interlocking connection therebetween.

5. In a tapping chuck, a socket member, a bottom plate associated therewith and extending into the socket member, reversing gear and clutch mechanism in said socket, and an anti-frictional bearing interposed between the plate extension and the adjacent wall of the socket member.

6. In a tapping chuck, a socket member, a bottom plate associated therewith, reversing gear and clutch mechanism in said socket, an extension carried by the bottom plate disposed in the socket member with the peripheral walls of the bottom plate and socket member lying flush with each other, and an anti-frictional bearing between the peripheral wall of the bottom plate extension and the adjacent inner wall of the socket member.

7. In a tapping chuck, a socket member, a bottom plate associated therewith, reversing gear and clutch mechanism in said socket, said socket member and bottom plate having adjacent coaxial walls spaced inwardly of the extreme peripheries thereof, and an anti-frictional bearing interposed between said adjacent coaxial walls.

8. In a tapping chuck, a socket member, reversing gear and clutch mechanism in said socket, a bottom plate associated with the socket member in telescopic relation with adjacent coaxial walls lying in proximity and an anti-frictional bearing interposed between said adjacent coaxial walls.

In testimony whereof we affix our signatures in presence of two witnesses.

EUGENE WERNER.
DOMINIK J. NIERZWICKI.

Witnesses:
ANNA M. DORR,
KARL H. BUTLER.